March 6, 1928.

C. A. BACON 1,662,022

LUBRICATING SYSTEM

Filed Oct. 17, 1922

INVENTOR
C. A. Bacon
BY
Dinson Thompson
ATTORNEYS.

March 6, 1928.

C. A. BACON 1,662,022

LUBRICATING SYSTEM

Filed Oct. 17, 1922

INVENTOR
C. A. Bacon
BY
Davison Thompson
ATTORNEYS.

March 6, 1928.

C. A. BACON

LUBRICATING SYSTEM

Filed Oct. 17, 1922

C. A. BACON

LUBRICATING SYSTEM

Filed Oct. 17, 1922

INVENTOR
C. A. Bacon
BY
Dawson Thompson
ATTORNEYS

March 6, 1928.  1,662,022

C. A. BACON

LUBRICATING SYSTEM

Filed Oct. 17, 1922 7 Sheets-Sheet 5

INVENTOR
C. A. Bacon
BY
ATTORNEYS.

March 6, 1928.

C. A. BACON 1,662,022

LUBRICATING SYSTEM

Filed Oct. 17, 1922      7 Sheets-Sheet 6

INVENTOR
C. A. Bacon
BY
Denison Thompson
ATTORNEYS.

March 6, 1928.  
C. A. BACON  
LUBRICATING SYSTEM  
Filed Oct. 17, 1922

INVENTOR  
C. A. Bacon  
BY  
Denison Thompson  
ATTORNEYS

Patented Mar. 6, 1928.

1,662,022

UNITED STATES PATENT OFFICE.

CHESTER A. BACON, OF AUBURN, NEW YORK, ASSIGNOR TO BOWEN PRODUCTS CORPORATION, OF AUBURN, NEW YORK, A CORPORATION OF NEW YORK.

LUBRICATING SYSTEM.

Application filed October 17, 1922. Serial No. 595,090.

This invention relates to a certain new and novel lubricating system and more specifically to a lubricating system for the chassis of a motor vehicle, for supplying lubricant such as oil to the bearings of such a chassis, including those bearings which are now commonly lubricated by means of grease cups or nipple connections for pressure guns, both of which latter devices are attendant with many disadvantages, including inaccessibility of certain bearings, the time required to fill the cups or to make the individual connections required, together with the probable chance of dirt or dust passing into the open cup or connection.

The present invention provides a simple and efficient apparatus by which a series of such bearings may be lubricated from a single source or reservoir, either gravity or pressure-actuated, by apparatus or permanent connection that avoid to a large extent the disadvantages of the old system.

Other objects and advantages relate to the details of construction of the reservoirs or tanks for the lubricant and to the particular method of conveying the lubricant in said reservoirs, and delivering the same to the permanent connections associated with the bearings.

Another object resides in the use of a plurality of reservoirs attached to the frame of the car at desired positions thereon, thereby avoiding extra lengths of tubing that would be required if all bearings were to be supplied from a single source, and minimizing the chance of stoppage at any time and of slow feed through long tubes in cold weather.

Other objects and advantages relate to the details of construction and arrangement of the parts of the apparatus, all as will more fully appear from the following description, taken in connection with the accompanying drawings, in which:—

Figure 1:
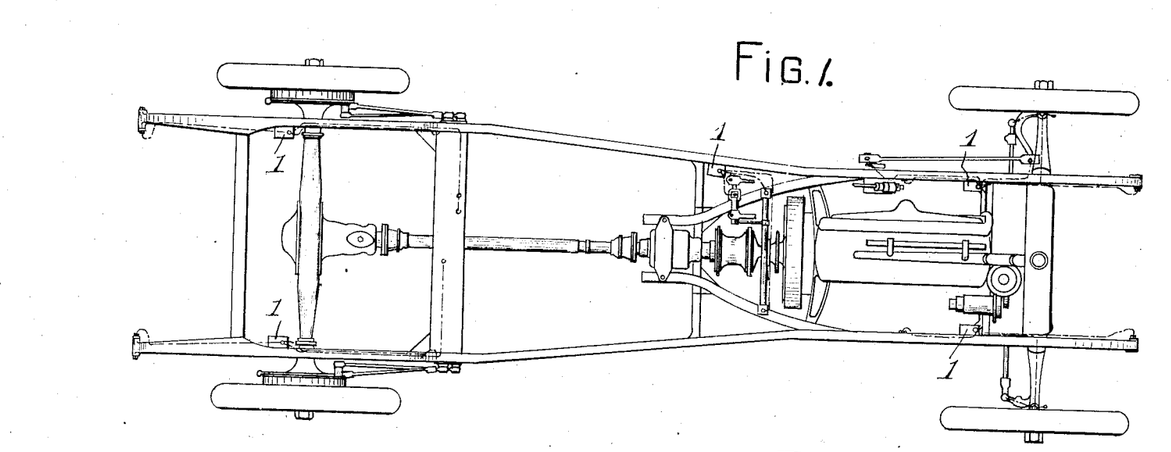
Figure 1 is a top plan view of a chassis illustrating the application of my invention thereto.
Figure 2:
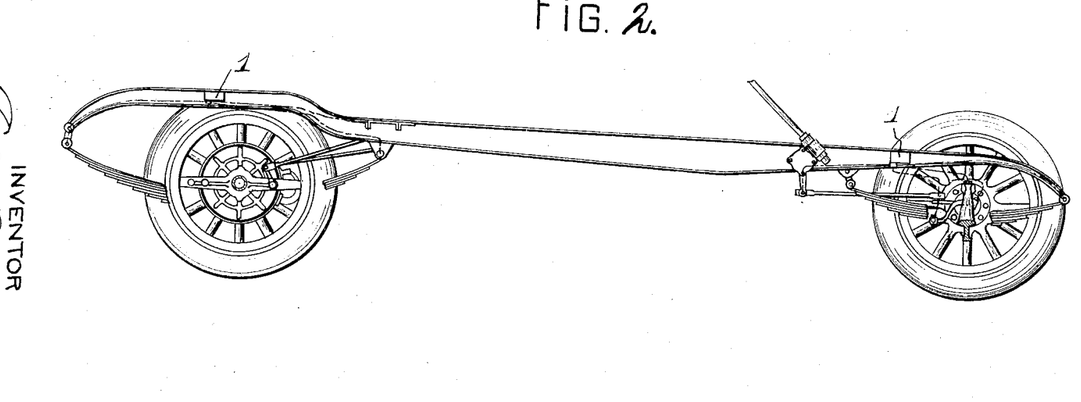
Figure 2 is a side elevation of the same.

As illustrated in general outline in Figure 1, the chassis of the vehicle is equipped with a plurality of reservoirs or tanks —1—, in this particular illustration, five in number, secured to and supported upon the chassis at desired points thereon, for instance, those illustrated.

These receptacles or tanks are connected by pipes, indicated in dotted lines, to the various adjacent bearings which it is desired that each tank shall furnish with lubricant, and it will be obvious that this system may be applied to any form of chassis and that any desired number of receptacles may be used, and may be connected to supply lubricant to desired bearings by the use of tubing and suitable unions.

Figure 3:
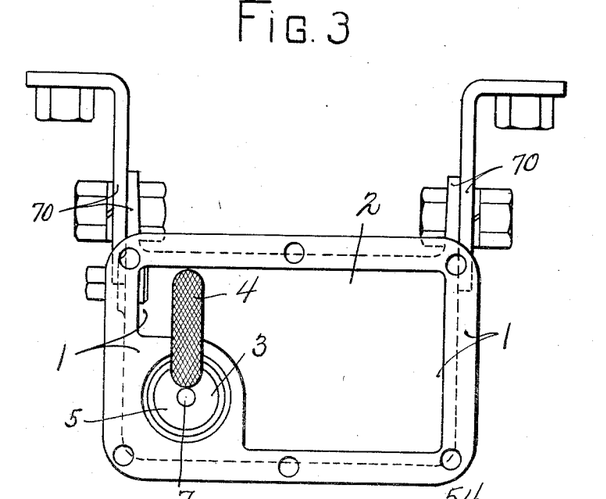
Figure 3 is a top plan view of one of the reservoirs with the cover removed.
Figure 4:
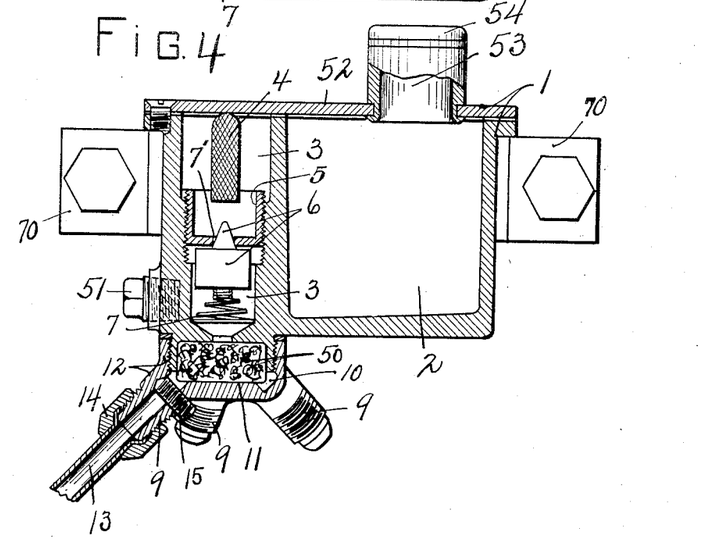
Figure 4 is a vertical sectional view of the reservoir illustrated in Figure 3.
Figure 5:
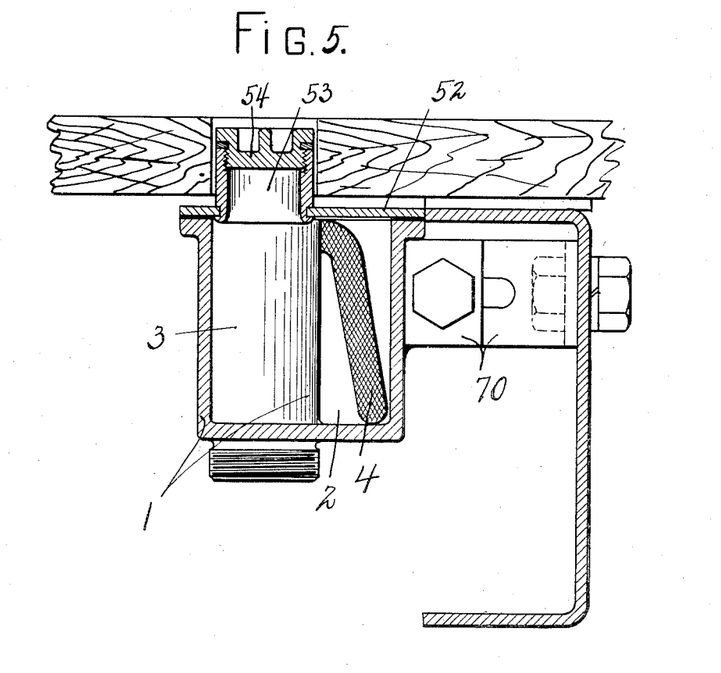
Figure 5 is a vertical sectional view of the reservoir of Figure 3 taken at right angles to Figure 4.

One form of a tank constituting a portion of this invention is illustrated in Figures 3, 4, and 5. In this form, the tank or receptacle —1— comprises two chambers —2— and —3—, the chamber —2— constituting the primary reservoir adapted to contain and retain the lubricant, except as the same may be fed therefrom by means of a wick —4— which has one end positioned in the chamber —2— and its opposite end projected through the wall separating the chambers, and extending into the chamber —3— for feeding lubricant to said chamber by capillary attraction.

The chamber —3— may have a portion of its interior wall threaded for co-operation with the interior threaded portion of a cup-shaped member —5— having an opening in its bottom wall permitting communication between the upper and lower portion of the chamber —3— when the valve —6— is moved from position within and closing the opening or orifice —7'— in said member —5—.

The valve —6— is normally held in closed position by means of spring —7—, the spring being of suitable strength and the valve —6— of suitable weight, so that the latter is in a sense balanced on the spring so as to dance and move up and down when the car is in motion, thereby letting the oil escape from the upper portion of the chamber —3— through the opening —7'— into the lower portion of said chamber, which is filled with a soft felt pad —50—. This pad is positioned within the chamber for the purpose of assisting in distributing the oil evenly through a plurality of outlets —9—, which distribution is further helped by the annular groove —10— around the raised center portion —11— in the bottom of the chamber —3—. The bottom of the chamber —3— may be constituted of a removable internally threaded cap —12—, provided with any desired number of projecting nipples —9—, which may, as shown, be externally threaded for connection to pipes —13— as by means of unions —14—.

The pad —50— and the grooves —10— will, in a measure, at least, tend to compensate for the lack of certainty that the tank or receptacle —1— will remain level when attached to the frame or chassis of the vehicle. Adjusting screws —15— are provided in each outlet from the bottom of the chamber —3—, or in the openings leading to the nipples —9— so that the flow of oil to each bearing can be controlled. The amount that should be supplied to each bearing will be determined by experiment and by observation of the bearings which are being supplied with too much oil, or which are not obtaining a sufficient supply.

All of the oil is conducted to the discharge chamber —3— by wick feed, thus absolutely insuring that the oil which reaches this chamber contains no dirt of any description. This feature of the absence of dirt is quite essential to my invention, and as there is no communication between the chambers —2— and —3— other than that filled by the wick, the wick will fill or partially fill the chamber —3— with absolutely clean oil, which can in no way upset the operation of the valve —6— which valve is so balanced with relation to the tension of the spring —7— as to remain normally in closed position when the car is stationary. The supply of absolutely clean oil to the chamber —3— makes the stoppage of the tubes or any portion of the oil line a practical impossibility, and insures a clean supply of oil to each bearing.

The tank may be secured to the chassis in any suitable way, as by means of adjusting brackets —70—.

Figure 6:
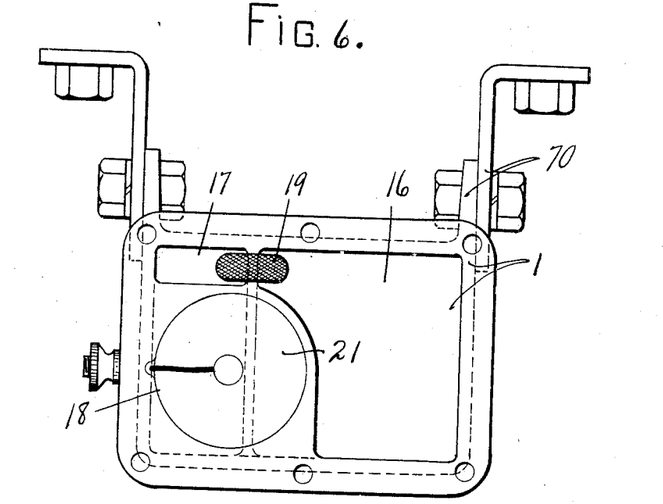
Figure 6 is a top plan view of a different form of reservoir with the cover removed.
Figure 7:
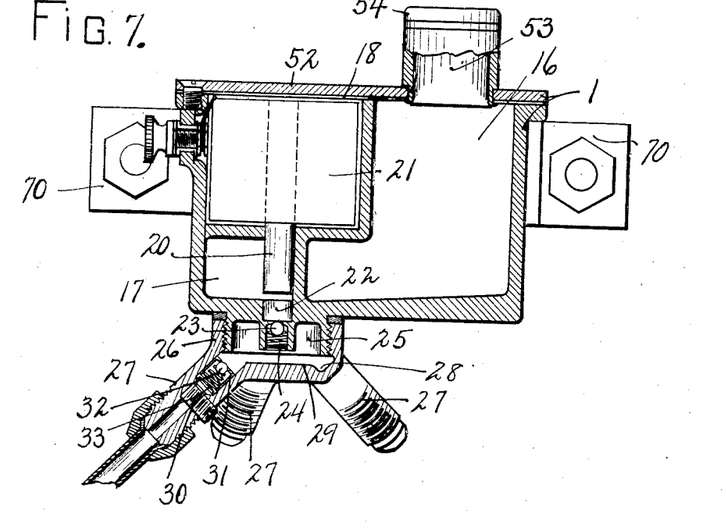
Figure 7 is a vertical sectional view of the structure of Figure 6.
Figures 8, 13:
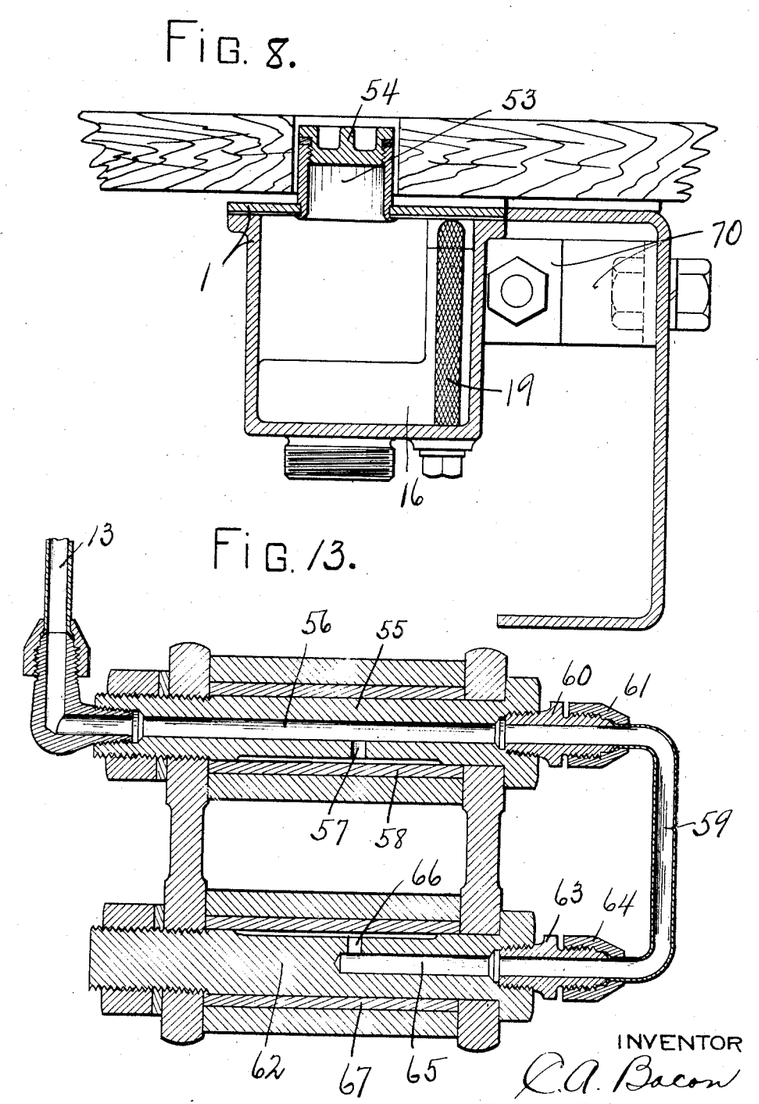
Figure 8 is a vertical sectional view of the structure of Figure 6 taken at right angles to the structure illustrated in Figure 7.
Figure 13 illustrates the method of supplying lubricant from one shackle bolt to the other, and a construction for effecting that supply.

In Figures 6, 7 and 8 a modified form of receptacle is shown in which the receptacle or tank is divided into three chambers, —16—, —17— and —18—. The chamber —16— constitutes the primary container for the lubricant which is fed from said chamber to the chamber —17— by means of the wick —19— which penetrates the wall separating said chambers, and in the manner heretofore described, constitutes a means for supplying an absolutely clean lubricant to the chamber —17—. This chamber —17— projects or extends beneath the chamber —18— and is in communication therewith through an opening closed by the core —20— of an electromagnet or solenoid structure —21— embodying the usual connections and devices for projecting the core —20— into the relatively small cylinder —22— which is supplied with oil by means of the wick —19— and constitutes a portion of the chamber —17—. The solenoid —21— may be connected to any source of electric current as the ordinary battery carried on the automobile, and the connections may include a switch positioned adjacent the driver's seat, or at any other desired portion of the vehicle for manual operation so that upon closing the circuit leading to the solenoid —21— the plunger or core —20— will be projected into the cylinder —22— to expel the oil therein through the opening in the bottom of the cylinder —22—, which opening is normally closed by a valve —23— actuated by spring —24—. The oil forced from the cylinder —22— is projected into the lower portion —25— of chamber —17— which in form and construction is similar to the lower portion of the chamber —3— heretofore described, and embodies a similar cap —26— including nipples —27— and annular groove —28— and the raised portion —29— for effecting proper distribution of the lubricant. In this construction, in addition to the screw plugs —30— the nipples may be provided with passageways formed in the cup-shaped members —31— arranged within the nipples, which passageways are normally closed by means of valves —32— actuated by springs —33—. These check valves are placed under substantially equal spring tension in order that each supply nozzle will be provided with an equal amount of oil regardless of whether one bearing offers more or less resistance than another. The check valve —23— is supplied to prevent sucking back of the oil into the upper portion of chamber —17— upon the return stroke of the plunger or core —20—. If more oil is forced through any one of the openings normally closed by a check valve —32— than can be passed by the screw or plug —30— as adjusted, then the particular check valve will close, trapping the surplus oil and preventing its return to the discharge chamber on the return stroke of the pump. With this structure, the electrical units may be omitted and the core —20— may be manually operated as a plunger to force oil into chamber —25—.

Figure 9:
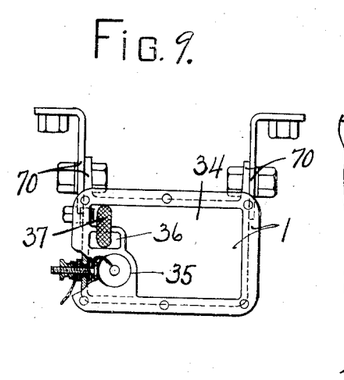
Figure 9 is a top plan view of a further modified form of lubricant receptacle with the cover removed.
Figure 10:
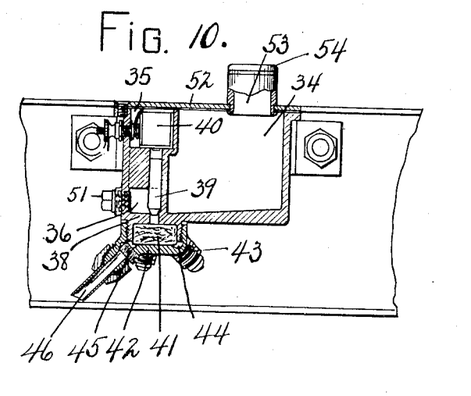
Figure 10 is a vertical sectional view of the structure of Figure 9.
Figure 11:
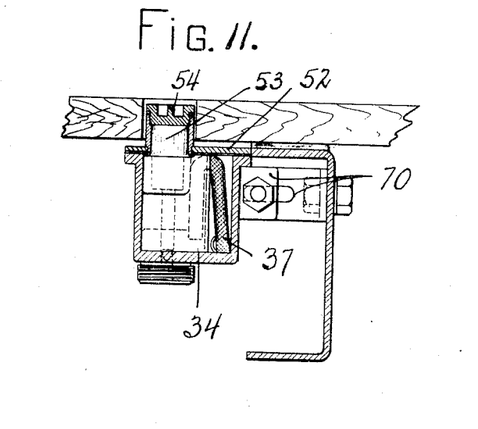
Figure 11 is a vertical sectional view of the structure of Figure 9 taken at right angles to the structure illustrated in Figure 10.
Figure 12:
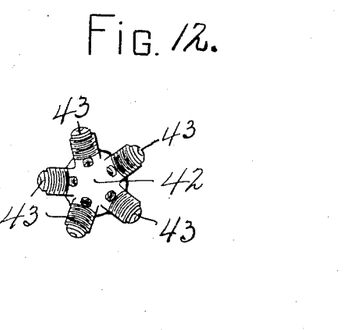
Figure 12 is a bottom plan view illustrating the trap which connects to the bottom of the reservoir and is provided with nipples for distributing the lubricant to the various connections desired.

In Figures 9, 10, and 11 a further modified form of reservoir is disclosed, and which in like manner as Figures 6, 7 and 8 embodies three chambers —34—, —35— and —36— the chamber —34— constituting the primary source of lubricant and from which the lubricant is fed to the chamber —36— by the wick —37— that penetrates the separating wall, the chamber —36— extending beneath the chamber —35— and being separated into two connected parts by a perforated partition —38—, the opening through which is normally closed by means of a sliding valve —39— adapted to be raised from its seat by means of an electromagnet —40— which may be connected to any source of potential and such connection may include a switch positioned at any point for actuating the valve —39— by electrical means, as desired, to permit passage of lubricant from the upper portion of the chamber —36— to the lower portion, and as hereinbefore described in connection with the former figures, the lower portion of chamber —36— encloses a pad —41— of felt and said chamber is partially formed by the cap —42— of similar construction to that illustrated in the former figures, and including nipples —43—, annular groove —44— and the valve plugs —45— for controlling the flow of the lubricant from the lower portion of the chamber —36— to the tube or tubes —46—.

The operation of this construction will be readily understood. When the magnet —40— is energized, the valve —39— is raised and the lubricant can flow from the upper to the lower part of chamber —36— from which it is fed to the tubes —46—. The valve closes by gravity when the energizing circuit is broken. All of these structures may be provided with a removable clean-out plug —51—. A cover plate —52— is provided in connection with each receptacle, and secured thereto by bolts or screws. This cover —52— may be provided with a filler opening —53— which may project through the floor board where desired, and is normally closed by screw plug —54—.

In Figure 13 there is illustrated a connection of one of the pipes —13— to the spring shackle, as for instance, of a motor vehicle. In this illustration the bolt —55— has a lengthwise oil passage —56— extending from end to end of the bolt, and a radial passage —57— permitting the escape of oil to the bearing —58—. The pipe —13— is connected to one end of the bolt —55— in communication with passageway —56— and the lubricant, as oil, may escape from the opposite end of the bolt through the U-shaped pipe —59— connected to the end of the bolt, as by the tubular nipple —60— and union —61—, the opposite end of the pipe —59— being connected to the adjacent end of bolt —62— by means of tubular nipple —63— and union —64—. The bolt —62— as shown, has a lengthwise passageway —65— extending for a portion of its length and leading to a radial passageway —66— forming means of communication with the bearing —67—. By this construction, the pipe —13— constitutes a means for lubricating both of the shackle bolts, one of said bolts being supplied with lubricant flowing through the other.

Figure 14:
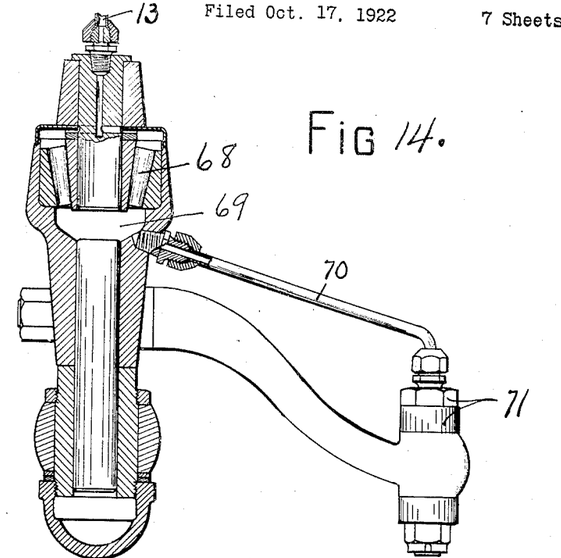
Figures 14 and 15 are vertical sectional views illustrating the application of my invention to two different forms of steering knuckles.
Figure 15:
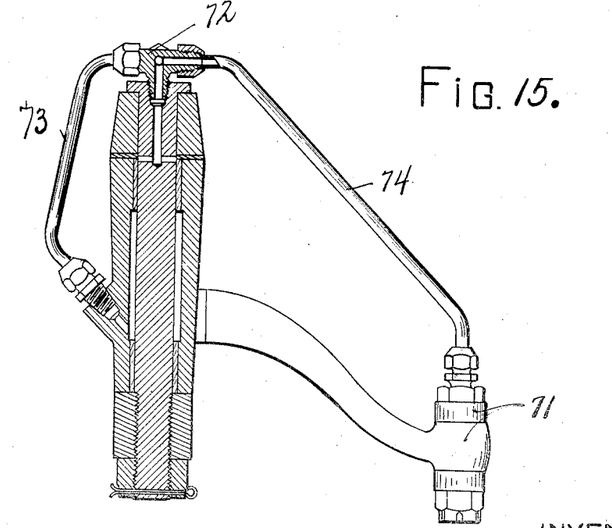

In Figures 14 and 15 I have illustrated a supply pipe, as the pipe —13— connected to two different forms of steering knuckles for lubricating the same, combined with additional means for conveying lubricant from the steering knuckle or the fitting used in connection therewith to the tie rod or drag link bearing. As illustrated in Figure 14, the pipe —13— may be connected to the upper end of the steering knuckle for feeding lubricant to the roller bearings —68— and chamber —69— for lubricating the steering knuckle, and at the same time by means of pipe —70— connected to the chamber —69— to effect lubrication of the tie rod bearing parts —71— or any other bearing parts rigidly associated with the steering knuckle, as for instance, the drag link bearing.

In Figure 15, a four-way fitting —72— is provided, one nipple of which is connected to the pipe —13—, another nipple of which is connected to the upper end of the steering knuckle for supplying lubricant thereto, and another nipple of which by means of the pipe —73— is connected to the lower portion of the steering knuckle for lubricating the lower bearing, and another nipple of which is connected by pipe —74— with the tie-rod bearing, or as before stated, any other bearing rigidly associated with the steering knuckle.

I have illustrated two well known forms of steering knuckles as illustrative of the application of my invention to any part of this character, by means of a pipe adapted to be permanently associated with the structure.

Altho I have shown and described specific apparatus, together with details of form, construction and arrangement of the same, all as illustrative of embodiments of my invention, I do not desire to restrict myself to the details of form, construction or arrangement of the apparatus or the parts thereof, as various changes may be made without departing from the invention, as set forth in the appended claims.

I claim:

1. A chassis lubricating apparatus comprising a lubricant supply tank having a lubricant-containing chamber and a lubricant discharging chamber, a wick constituting the sole means of feeding lubricant from the containing chamber to the discharging chamber, means including a spring supported substantially balanced valve for dividing the discharging chamber into two chambers, an absorbent pad in the lower portion of the discharging chamber, and conduits leading from the lower portion of the discharging chamber to chassis bearings and adapted to receive lubricant from said pad.

2. A lubricating apparatus comprising a lubricant supply tank including a lubricant containing chamber and a lubricant discharging chamber, a wick constituting the sole means of feeding lubricant from the containing chamber to the discharging chamber, means including a valve for dividing the discharging chamber into two chambers, conduits leading from the portion of the discharging chamber beyond the valve to bearings adapted to be lubricated, and an absorbent pad in the portion of the discharging chamber beyond the valve for supplying lubricant to the conduits.

3. In an apparatus of the class described, a lubricant supply tank having a lubricant-containing chamber and a lubricant discharging chamber, the latter chamber comprising an upper and a lower portion connected by a valve controlled opening, a valve controlling said opening, means for conveying lubricant from the containing chamber to the upper portion of the discharging chamber, conduits leading from the lower portion of the discharging chamber beyond the valve controlled opening, and an absorbent pad in the lower portion of the discharging chamber for supplying lubricant to the conduit.

In witness whereof I have hereunto set my hand this 9th day of October, 1922.

CHESTER A. BACON.